US006788683B1

(12) United States Patent
Ikeda et al.

(10) Patent No.: US 6,788,683 B1
(45) Date of Patent: Sep. 7, 2004

(54) FLOW IDENTIFYING DEVICE, FLOW PROCESSING DEVICE, FLOW IDENTIFYING METHOD, AND FLOW PROCESSING METHOD

(75) Inventors: Hiroshi Ikeda, Tokyo (JP); Yuichi Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 662 days.

(21) Appl. No.: 09/716,239

(22) Filed: Nov. 21, 2000

(30) Foreign Application Priority Data

Nov. 25, 1999 (JP) .......................................... 11-334981

(51) Int. Cl.[7] .............................................. H04L 12/28
(52) U.S. Cl. .................. 370/389; 370/395.52; 370/401
(58) Field of Search ................................ 370/389, 392, 370/466, 474, 473, 395.1, 401, 395.52

(56) References Cited

U.S. PATENT DOCUMENTS

| 5,623,605 | * | 4/1997 | Keshav et al. .............. 709/236 |
| 5,930,259 | * | 7/1999 | Katsube et al. ............. 370/409 |
| 6,023,466 | * | 2/2000 | Luijten et al. ......... 370/395.31 |
| 6,275,494 | * | 8/2001 | Endo et al. ............ 370/395.52 |
| 6,633,563 | * | 10/2003 | Lin et al. ..................... 370/389 |

* cited by examiner

Primary Examiner—Chau Nguyen
Assistant Examiner—Nittaya Juntima
(74) Attorney, Agent, or Firm—Young & Thompson

(57) ABSTRACT

The flow identification device includes a retrieval flag table 3, a mask section 4, and a flow retrieval table 5 formed of a content-addressable memory (CAM). The retrieval flag table 3 stores a retrieval flag which sets a field to be retrieved among fields in the header of a received IP packet and an input logical link number corresponding thereto and outputs a flag corresponding to an extracted input logical link number. The mask section 4 masks each field in the header of a received IP packet with the retrieval flag and creates a post-mask retrieval key. The flow retrieval table 5 stores a post-mask retrieval key and a flow retrieval in a correspondence relationship and outputs a flow retrieval corresponding to the post-mask retrieval key output from the mask section.

10 Claims, 11 Drawing Sheets

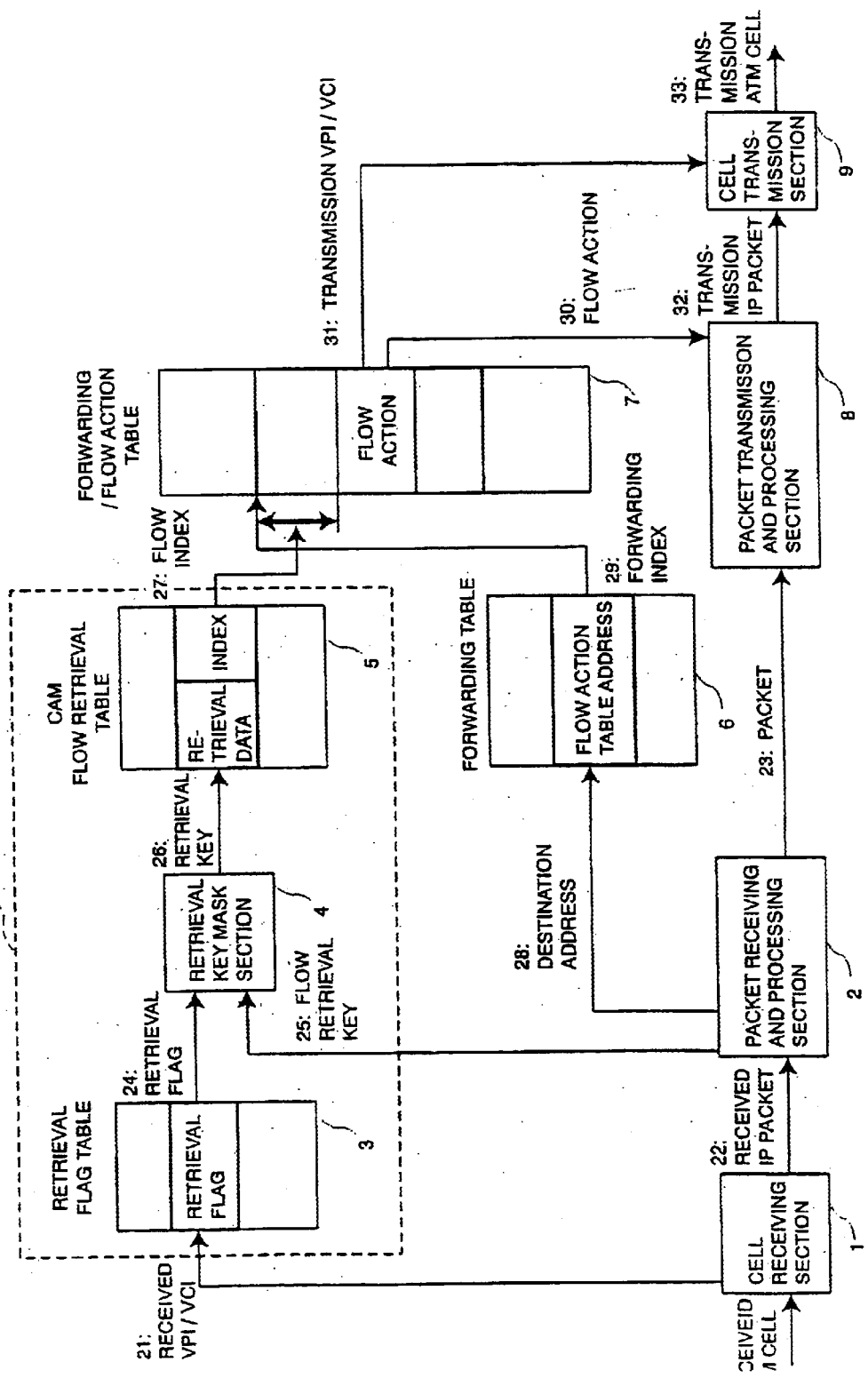

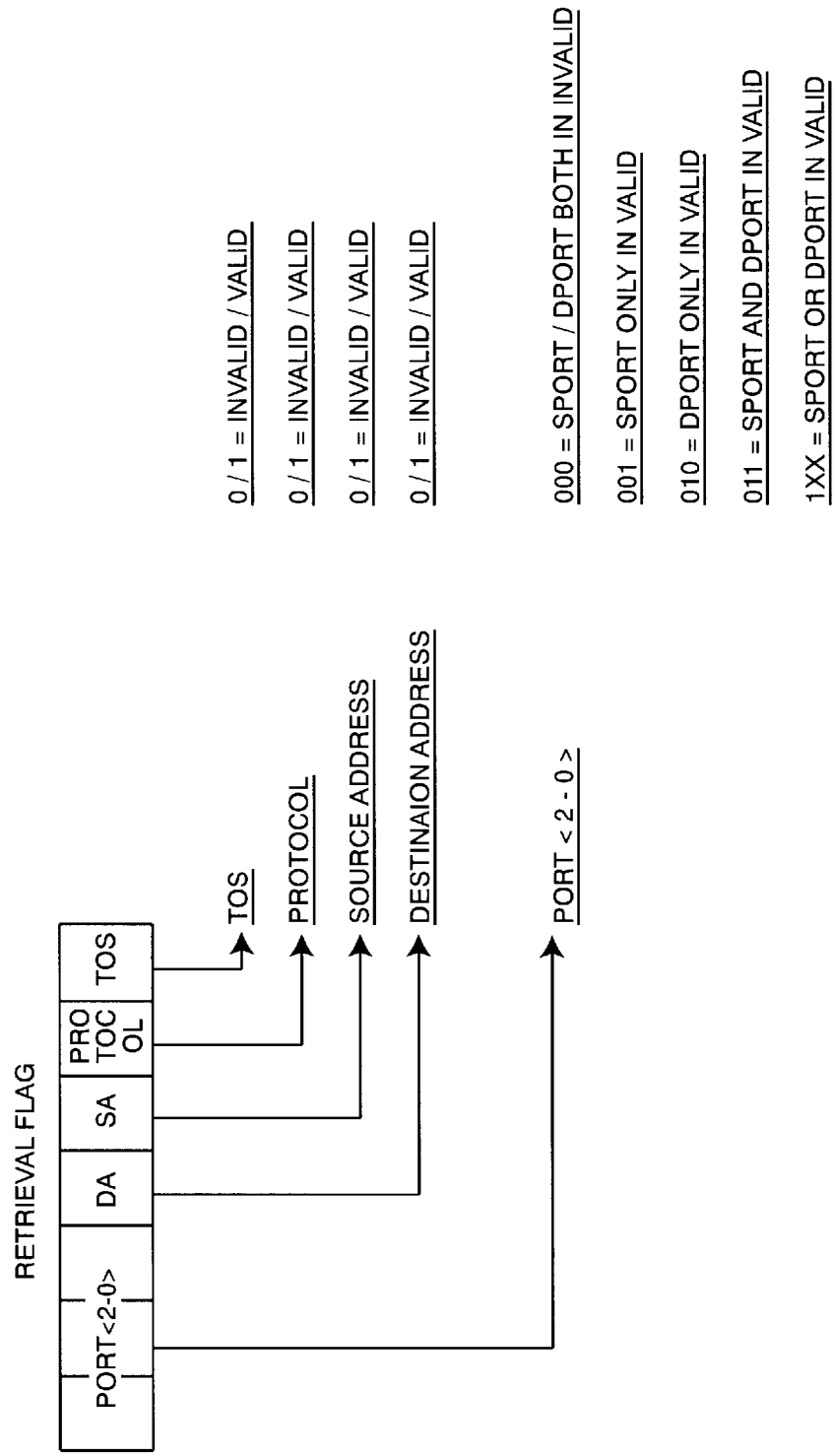

FIG.3

| RETRIEVAL KEY (PORT<2-0>) | TYPE OF PORT NUMBER RETRIEVAL | RETRIEVAL KEY (DPORT, SPORT) | |
|---|---|---|---|
| 000 | SPORT/DPORT BOTH IN INVALID | 0x0000 | 0x0000 |
| 001 | SPORT ONLY IN VALID | 0x0000 | SPORT |
| 010 | DPORT ONLY IN VALID | DPORT | 0x0000 |
| 011 | SPORT AND DPORT IN VALID | DPORT | SPORT |
| 1xx | SPORT OR DPORT IN VALID | 0x00FF | PORT |

FIG.4

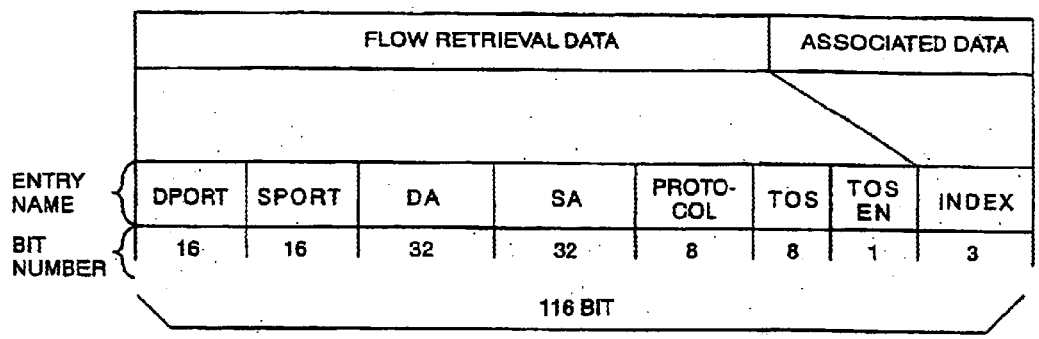

CAM FLOW RETRIEVAL TABLE

| | FLOW RETRIEVAL DATA | | | | | | ASSOCIATED DATA |
|---|---|---|---|---|---|---|---|
| ENTRY NAME | DPORT | SPORT | DA | SA | PROTO-COL | TOS | TOS EN | INDEX |
| BIT NUMBER | 16 | 16 | 32 | 32 | 8 | 8 | 1 | 3 |

116 BIT

RETRIEVAL DATA

| TOS-EN | 1 BIT |
|---|---|
| TOS | 8 BIT |
| PROTOCOL | 8 BIT |
| SOURCE ADDRESS (SA) | 32 BIT |
| DESTINATION ADDRESS (DA) | 32 BIT |
| SOURCE PORT (SPORT) | 16 BIT |
| DESTINATION PORT (DPORT) | 16 BIT |
| TOTAL | 113 BIT |

ASSOCIATED DATA

| INDEX | 3 BIT |
|---|---|
| TOTAL | 3 BIT |

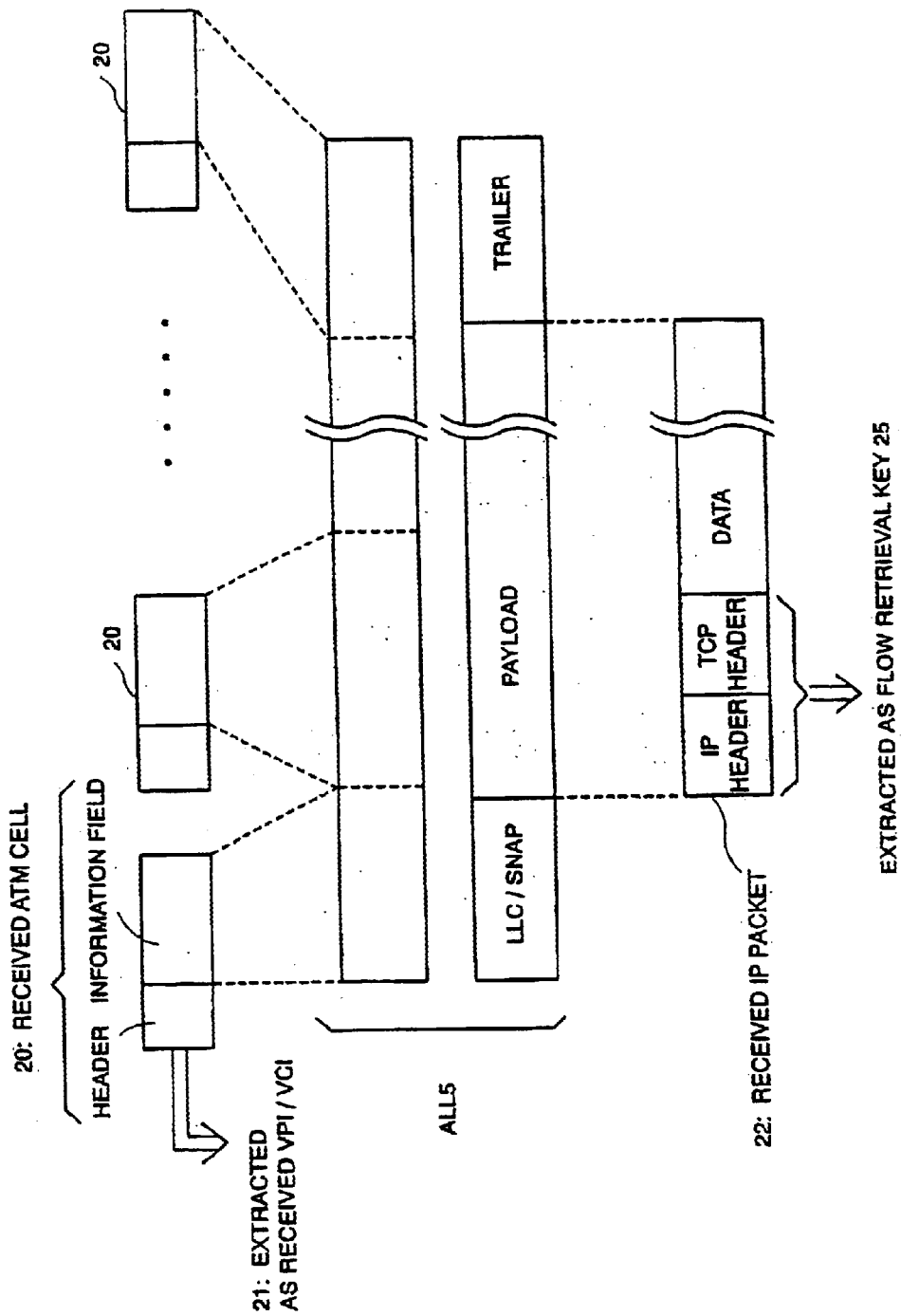

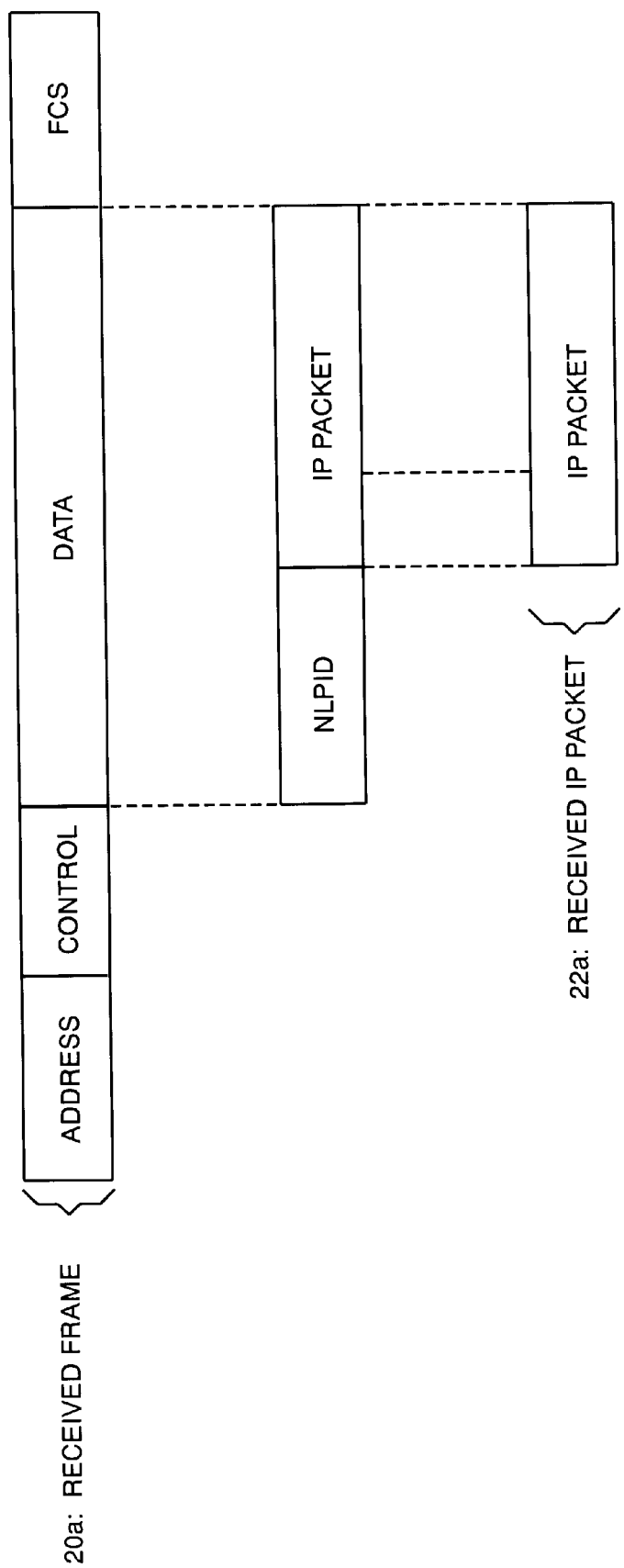

FLOW IDENTIFYING DEVICE, FLOW PROCESSING DEVICE, FLOW IDENTIFYING METHOD, AND FLOW PROCESSING METHOD

BACKGROUND OF THE INVENTION

The present invention relates to a technique of controlling the flow of data such as IP packets on the Internet.

Recently, without being restricted to the best-effort-type service, the quality of services (QoS) including transmission delay, variations in delay, minimum guaranteed speed, or peak speed has been importantly concerned even when information on voice, images and so on are transferred in real time under the traffic control on the Internet.

The content of QoS to be required depends on the IP traffic. For example, requirements for transmission delay are not strict in the case of the best-effort-type traffic. In contrast, in the case of image information, strict requirements are required for transfer delay or variations in delay in order to avoid interruption of images.

In order to realize an optimum quality of services (QoS) for each IP (Internet Protocol) traffic, the IETF (Internet Engineering Task Force) is studying to standardize the specifications—Intserv (integrated services) and Diffserv (differentiated services)—. In the Intserv specification, QoS is guaranteed by reserving an end to end range using RSVP (resource reservation protocol). In the Diffserv specification, in order to realize QoS on, particularly, the backbone network, priority information is added to each IP packet so that the traffic flowing on the backbone is controlled.

Moreover, since QoS can be guaranteed for each connection in the asynchronous transfer mode (ATM), the approach of mapping QoS of an IP packet on the ATM connection is taken as means of providing QoS of an IP packet in the ATM.

In order to guarantee QoS through the mapping, a data flow (hereinafter referred to as "flow") being formed of a sequence of IP packet groups is identified so that QoS is set in accordance with the identified flow.

The flow is identified for each data based on various data combinations. The data combination is formed by selecting all fields or a specific field only of fields within the header of an IP packet according to a difference of the flow type or the presence or absence of a specific transmission source or transmission destination.

In other words, fields including "TOS (type of services)" within the header of an IP packet, "PROTOCOL" of an IP packet defining a network layer protocol, "source address (SA)" being a source address, "destination address (DA)" being a destination address, and "source port (SPORT)" or "destination port (DPORT)" of TCP (transmission control protocol) header or UDP (user datagram protocol) header defining a transport layer protocol are handled as flow identification objects.

A selective combination of specific fields of those fields, for example, a combination of "SA" and "DA", a combination of "SPORT" and "DPORT", or a combination of "SA", "DA", "SPORT", "DPORT" and "PROTOCOL", becomes an actual object for flow identification.

As described above, there are a great number of fields to be selected for flow identification. Data of each field is represented in plural bits—16 bits or 32 bits—. For that reason, the number of bits for the retrieval key is increased for flow identification. As a result, outputting the flow identification result with the retrieval table largely widens the bit width of the retrieval key for the retrieval table.

The various combinations of fields for actual identification of fields require complicated identification rules for flow identification. Conventionally, in order to deal with such requirements, the flow identification is performed by software.

However, it is difficult to implement high speed flow identification in the software processing. An increasing number of heavy traffics to be handled occur a bottleneck in processing, thus resulting in congestion in a network. For that reason, an application range for the flow identification by software is limited to small size networks such as LANs (local area networks) or to areas with a relatively small number of traffics such as access systems of WANs (wide area networks).

In near future, the traffic of an IP packet is expected to increase explosively. For that reason, it is considered that even small size networks such as LANs or access systems in WANs will require the system that can deal with a large volume of traffics.

The ATM has the advantage of performing traffic control by hardware every logical link, so that the type of services (QoS) can be ensured without occurring a process bottleneck even on high-speed broadband networks. However, the high-speed technique in a hardware level has not been yet established even in the ATM to map the flow of an IP packet to an ATM logical link compatible QoS. For that reason, the intervention of software is needed to the QoS mapping and a high-speed flow identification process has been not realized.

Recently, content-addressable memory (CAM) has been used in the field of address retrieval in the network system devices. The content-addressable memory determines a memory location through label association and indicates it with the content, not address. The content-addressable memory can retrieve data on the retrieval data table at high speed. Since the capacity of a content-addressable memory depends on only the number of entries, the content-addressable memory can retrieve data with large data bit width at high speed, without an increase of the capacity.

However, the content-addressable memory can perform only the exact matching retrieval. In order to configure a retrieval table for flow identification with the content-addressable memory, it is required to register entries in which combinations of all fields to be selectable for flow identification correspond to all flow identification results. In this case, an enormous number of registration entries lead to a expanded retrieval table. The enormous number of registration entries takes much time for retrieval, thus making it difficult to implement a high-speed process for flow identification. For example, where the total number of bits of each field in a header is 128 bits, it is necessary to register entries of 128th power of 2. This is not realistic. Therefore, it has been difficult to configure the flow retrieval table with content-addressable memory.

SUMMARY OF THE INVENTION

The present invention is made to overcome the above-mentioned problems. An object of the present invention is to provide a flow identification technique that can implement a flow identification process at high speed.

The present inventor of this application noticed that the field of a header for actual flow identification is usually a part of the entire field. The present inventor has come to the idea that the number of entries of the retrieval table will be able to be decreased by masking a field based on an input logical link number of received data and extracting the field only for actual flow identification. As a result, a content-addressable memory (CAM) can be used, thus speeding the flow identification process.

According to the present invention, the flow identification device comprises a retrieval flag table for storing an input logical link number of received data and a retrieval flag in a corresponding relationship, the retrieval flag setting a field to be retrieved among fields in a header of a received IP (internet protocol) packet terminating the received data, and for outputting a retrieval flag corresponding to an input logical link number extracted from the received data; a mask section for masking each field in a header of the received IP packet with the retrieval flag and creating a post-mask retrieval key; and a flow retrieval table configured of a content-addressable memory, for storing the post-mask retrieval key and a flow identification result in a corresponding relationship and outputting a flow identification result corresponding to a post-mask retrieval key output from the retrieval flag table.

As described above, in the flow identification device of the present invention, a retrieval flag table is provided that sets a retrieval flag indicating a field for flow retrieval among fields of a packet header every input logical link number. Each field of a package header extracted from a received IP packet is masked with the retrieval flag to create a post-mask retrieval key. The use of the post-mask retrieval key allows the number of entries to the flow retrieval table to be reduced. As a result, the content-addressable memory that can execute only the exact matching can be utilized as a flow retrieval table for flow identification, thus performing high-speed flow identification.

The flow identification device of the present invention can ensure the quality of services (QoS) without bottlenecking the process even on the high-speed broadband network. This device is preferably used even in the area requiring high throughputs such as backbone networks.

Moreover, the use of the content-addressable memory as a flow retrieval table allows the flow identification process to be performed at high speed. Moreover, the use of the content-addressable memory can prevent the flow retrieval table from being large scaled.

Since the flow retrieval table is not large scaled, the IP flow, which can be conventionally realized with only the software, a flow identification process for the ATM logical link compatible QoS mapping, can be realized with hardware such as dedicated LSI chips. The use of hardware enables the flow identification process at higher speed.

For example, either information directly indicating the setting of QoS or information indirectly including information for QoS setting may be output as a flow identification result. In such a case, the retrieval key for retrieving information for setting QoS may be output.

According to the present invention, the flow retrieval table stores a corresponding numerical value in a field to be validated in retrieval as the retrieval flag and an invalid value in a field to be invalidated in retrieval.

By registering a value that indicates invalid in the field to be invalidated, the retrieval flag can be easily utilized as a mask.

According to the present invention, the retrieval flag indicates valid or invalid of respective bits forming the field.

As described above, a post-mask retrieval key, in which the field is partially masked, can be created by using the mask of a bitmap to respective bits forming a field. As a result, for example, all destination addresses and all transmission addresses, in which partial bits of the network address are common, can be handled as targets at the same time.

According to the present invention, when the received data is an ATM (asynchronous transfer mode) cell, one or both of a virtual path identifier and a virtual channel identifier are used as the input logical link number and as the output logical link number.

According to the present invention defined in claim 5 of the present invention, when the received data is a frame relay, DLCI (data link connection identifier) is used as the input logical link number and as the output logical link number.

According to the present invention, when received data is for an ATM cell or a frame relay, the post-mask retrieval key can be easily obtained by referring to the retrieval flag table.

According to the present invention, fields for TOS (type of services), PROTOCOL, source address (SA), and destination address (DA) of an IP header as well as fields for a source port (SPORT) and a destination port (DPORT) of TCP (transmission control protocol) or UDP (user datagram protocol) header are included as the header field of the packet.

Since the above-mentioned field is selected as flow identification target, flow identification can be accurately performed.

According to the present invention, the flow processing device comprises a receiving section for extracting an input logical link number from received data and terminating the received data and creating a received IP packet; a packet receiving and processing section for extracting each field of a header as a retrieval key from the received IP packet and extracting a destination address and outputting a packet; a retrieval flag table for storing the input logical link number and a retrieval flag in a correspondence relationship, the retrieval flag setting a field to be retrieved among fields of the header of the received IP packet, and for outputting a retrieval flag corresponding to an input logical link number extracted by the receiving section; a mask section for masking each field of a header of a received IP packet with the retrieval flag and creating a post-mask retrieval key; a flow retrieval table for storing a post-mask key and a flow retrieval as a flow identification result in a correspondence relationship and outputting a flow retrieval corresponding to a post-mask retrieval key output from the retrieval flag table, the flow retrieval table being formed of a content-addressable memory; a forwarding table for storing a destination address of a header of the received IP packet and a forwarding retrieval in a correspondence relationship and outputting a forwarding retrieval corresponding to a destination address output from the packet receiving and processing section; a flow action table for storing a group of the flow retrieval and the forwarding retrieval and flow action information having information setting QoS (quality of services) and an output logical link number in a correspondence relationship and for outputting flow action information and an output logical link number, corresponding to a group of a flow retrieval output from the flow retrieval table and a forwarding retrieval output from the forwarding table; a packet transmission and processing section for processing a packet output from the packet receiving and processing section based on flow action information output from the flow action table and for creating a transmission IP packet; and a transmission section for disassembling the transmission IP packet to create a transmission cell and transmitting the transmission cell to an address indicating an output logical link number output from the flow action table.

In the flow processing device of the present invention, a post-mask retrieval key created by the mask section is used with a retrieval flag retrieved from the retrieval flag table so that the number of entries to the flow retrieval table can be decreased. As a result, since the content-addressable memory, that can perform only the exact matching, can be used for flow identification as a flow retrieval table, the flow identification can be easily processed at high speed.

Moreover, the use of the content-addressable memory as a flow retrieval table enables high-speed flow identification and can avoid an enlarged flow retrieval table.

The IP flow, which can be conventionally realized with only the software, a flow identification process for the ATM logical link compatible QoS mapping, can be realized with hardware such as dedicated LSI chips. The use of hardware allows the flow identification to be executed at higher speed.

According to the present invention, when the receiving section receives received data from any one of plural input ports and the transmission section transmits transmission data to any one of plural output ports, the receiving section outputs an input physical port number to the retrieval flag table, in addition to the input logical link number, the input physical port number indicating an input port which has received the received data, among the input ports and the flow action table outputs an output physical port number to the transmission section, in addition to an output logical link number, the output physical port number indicating an output port outputting the transmission data among the output ports.

Adding the input physical port number to a retrieval key of the retrieval flag table makes it possible to easily identify a flow received from a different port.

According to the present invention, a flow identification method comprising the steps of retrieving a retrieval flag corresponding to an input logical link number extracted from received data from a retrieval flag table, the retrieval flag table storing an input logical link number of received data and a retrieval flag setting a field to be retrieved among fields of a header of a received IP packet terminating the received data; creating a post-mask retrieval key by masking each field of a header of the IP packet with the retrieval flag; and storing a post-mask retrieval key and a flow identification result in a correspondence relationship and outputting a flow identification result corresponding to a post-mask retrieval key output from the retrieval flag table from a flow retrieval table, the flow retrieval table being configured of a content-addressable memory.

According to the present invention, a flow processing method comprising the steps of extracting an input logical link number from received data and terminating the received data and creating a received IP packet; extracting each field of a header as a retrieval key from the received IP packet while extracting a destination address; retrieving a retrieval flag corresponding to an input logical link number extracted from received data from a retrieval flag table, the retrieval flag table storing the input logical link number and a retrieval flag setting a field to be retrieved among fields of a header of the received IP packet in a correspondence relationship; creating a post-mask retrieval key by masking each field of a header of a received IP packet with the retrieval flag; storing a post-mask retrieval key and a flow retrieval as a flow identification result including information for setting QoS (quality of services) in a correspondence relationship and retrieving a flow retrieval corresponding to a post-mask retrieval key output from the retrieval flag table from a flow retrieval table, the retrieval table being configured of a content-addressable memory; retrieving a forwarding index corresponding to a destination address extracted from a received IP packet from a forwarding table, the forwarding table storing a destination address of a header of the received IP packet and a forwarding index in a correspondence relationship; retrieving flow action information and an output logical link number, corresponding to a group of a flow index retrieved with the flow retrieval table and corresponding to a forwarding index output with reference to a flow action table, the flow action table storing a group of the flow index and the forwarding index and flow action information including indication information setting QoS and an output logical link number, in a correspondence relationship; processing the received IP packet based on flow action information output from the flow action table to create a transmission IP packet; and creating transmission data based on the transmission IP packet and transmitting the transmission data to a destination indicating an output logical link number output from the flow action table.

As described above, according to the flow identification method and the flow processing method of the present invention, a post-mask retrieval key created by the mask section is used with a retrieval flag retrieved from the retrieval flag table. Thus, the number of entries to the flow retrieval table can be reduced. As a result, the content-addressable memory, which can perform only the exact matching, can be utilized for flow identification as a flow retrieval table so that the flow identification can be performed at high speed.

BRIEF DESCRIPTION OF THE DRAWINGS

This and other objects, features and advantages of the present invention will become more apparent upon a reading of the following detailed description and drawings, in which:

FIG. 1 is a block diagram explaining the configuration of a flow identification device according to an embodiment of the present invention;

FIG. 2 is a diagram explaining a retrieval flag;

FIG. 3 is a diagram explaining a retrieval key;

FIG. 4 is a diagram explaining a flow retrieval table;

FIG. 5 is a diagram explaining the processing of a cell receiving section and a packet receiving and processing section according to the first embodiment;

FIG. 11 is a block diagram explaining the configuration of a flow identification device according to a fourth embodiment and FIG. 12 is a diagram explaining the processing of a cell receiving section and a packet receiving and processing section according to the fourth embodiment.

DESCRIPTION OF THE EMBODIMENTS

Figure 6:
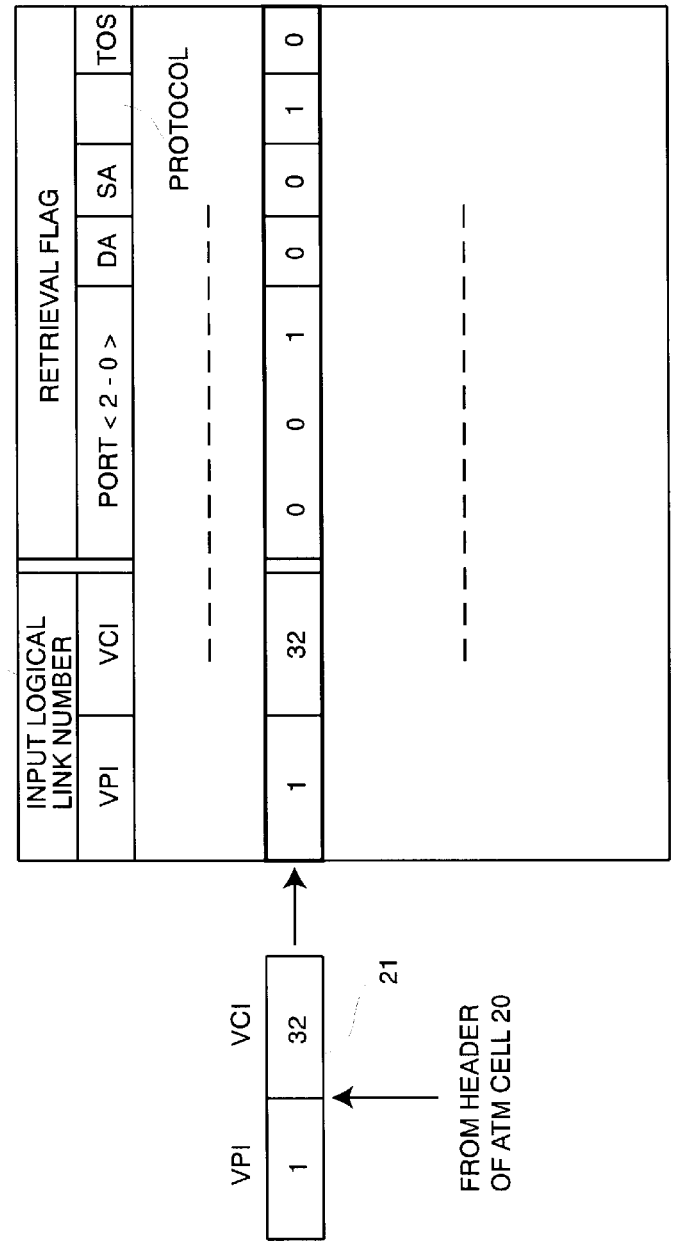
FIG. 6 is a diagram illustrating a retrieval process in a retrieval flag table.

Preferred embodiments of the present invention will be described below in detail with reference to the attached drawings.

First Embodiment

First, a flow identification process in which an ATM cell is received as input data will be described below according to a first embodiment of the present invention by referring to FIG. 1.

FIG. 1 is a block diagram explaining a flow processing device 10 of the first embodiment and the configuration of a flow processing device including the same. As shown in FIG. 1, the flow identification device includes a cell receiving section 1 acting as a receiving section, a packet receiving and processing section 2, a retrieval flag table 3, a retrieval key mask section 4 acting as a mask section, a CAM flow retrieval table 5, a forwarding table 6, a forwarding/flow action table 7 acting as a flow action table, a packet transmission and processing section 8 and a cell transmissions section 9 as a transmission section.

In addition to the retrieval flag table 3, the CAM flow retrieval table 5, the forwarding table 6 and the forwarding/flow action table 7, an actual flow identification device includes an access control section that retrieves those tables. However, the explanation of the access control section will not be omitted in this embodiment.

The receiving section 1 extracts an input logical link number from received data and terminates the received data, thus creating a received IP packet. In this embodiment, an input logical link number is extracted from the received ATM cell 20 while the received IP packet 22 is configured in accordance with the type 5 of AAL (ATM adaptation layer).

In this example, the connection (received VPI/VCI) 21 of a virtual path identifier (VPI) and a virtual channel identifier (VCI) described in the header of an ATM cell is extracted as an input logical link number.

The packet receiving and processing section 2 checks the normality of the header of the received IP packet 22 output from the cell receiving section 1. When the header is normal, the packet receiving and processing section 2 extracts each field of the header as the flow retrieval key 25 from the header of the received IP packet 22 as well as the destination address (DA) 28, thus outputting the packet 23.

In this embodiment, fields, including "TOS", "PROTOCOL", "source address (SA)", and "destination address (DA)" of an IP header as well as "source port (SPORT) and "destination port (DPORT)" of TCP or UDP header, are extracted as each field of the header of the received IP packet.

The retrieval flag table 3 stores a retrieval flag for setting a field to be retrieved of fields of the header of a received IP packet and a connection as an input logical link number in a correspondence relationship. The retrieval flag table 3 outputs a retrieval flag 24 corresponding to the received VPI/VCI 21, as an input logical link number extracted by the cell receiving section 1.

Using an arbitrary suitable method such as two-branch searching, the retrieval flag table 3 can be retrieved in accordance with the longest prefix matching or other arbitrary suitable rule.

The retrieval flag will be explained with reference to FIG. 2.

As shown in FIG. 2, the retrieval flag in this embodiment is formed of respective fields—"PORT<2-0>", "DA", "SA", "PROTOCOL" and "TOS".

Of those fields, "PORT<2-0>", formed of three bits, represents that "SPORT" and "DPORT" are valid or invalid in the header. In each of the remaining fields in the header, valid or invalid is represented in a bit value. For example, the bit value "1" is valid and the bit value "0" is invalid.

When "PORT<2-0>" is 000, "SPORT" and "DPORT" are assumed to be invalid. When "PORT<2-0>" is 001, "SPORT" only is assumed to be valid. When "PORT<2-0>" is 010, "DPORT" only is assumed to be valid. When "PORT<2-0>" is 011, "SPORT" and DPORT" are assumed to be valid. When "PORT<2-0>" is 1xx (where x represents 0 or 1), "SPORT" or "DPORT" is assumed to be valid.

FIG. 3 shows the retrieval key in which "PORT<2-0>" has the above-mentioned value.

The retrieval key mask section 4 masks each field of the header of the received IP packet 22 with the retrieval flag 24 and creates the post-mask retrieval key 26.

In this embodiment, fields—"TOS", "PROTOCOL", "SA", "DA", "SPORT" and "DPORT" —extracted as the flow retrieval key 25 by the packet receiving and processing section 2 are masked with the retrieval flag 24 output from the flag retrieval table 3. Thus, the post-mask retrieval key 26 is created.

The CAM flow retrieval table 5, formed of a content-addressable memory (CAM), stores post-mask retrieval keys and flow indexes (flow Index) in a correspondence relationship.

An example of the configuration of the CAM flow retrieval table 5 will be explained with reference to FIG. 4.

As depicted in FIG. 4, each entry in the CAM flow retrieval table 5 is formed of flow retrieval data acting as a post-mask retrieval key and associated data acting as a flow Index. The flow retrieval data is formed of 116 bits including 16 bits "DPORT", 16 bits "SPORT", 32 bits "DA", 32 bits "SA", 8 bits "PROTOCOL", 8 bits "TOS", and 1 bit "TOSEN". The flow Index is configured of 3 bits.

In this embodiment, a corresponding numeral value of flow retrieval data is registered in a field to be validated in retrieval. An invalid value is registered in a field to be invalidated in retrieval. In the columns except "TOS", "0" is a value representing invalid. The reason is that the value "0" represents "reserved" in fields—"PROTOCOL", "SA", "DA", "SPORT", and "DPORT" of TCP (transmission control protocol)/IP (Internet protocol)—according to RFC (request for comments) 1700 (Assigned Number) of the IETF standards and is not usually used.

In contrast, the value "0" is usually used in the field "TOS". In this embodiment, in addition to the "TOS" field, the "TOSEN" (1 bit) column representing valid "1" or invalid "0" of the "TOS" field is added to the flow retrieval data column.

The CAM flow retrieval table 5 outputs a flow Index corresponding to the post-mask retrieval key 26 output from the retrieval flag table.

The flow Index 27 becomes an address of the forwarding/flow action table 7 to be next explained.

The forwarding table 6 stores the destination address (DA) of the header of the received IP packet 22 and the forwarding Index in a correspondence relationship. The forwarding table 6 outputs the forwarding Index 29 corresponding to the destination address 28 output from the packet receiving and processing section 2.

Using an arbitrary suitable method such as the two branch searching method, the forwarding table 6 can be retrieved in accordance with other arbitrary suitable rule including the longest prefix matching.

The forwarding/flow action table 7 stores a group of a flow Index and a forwarding Index and a flow action and an output logical link number, correspondingly. The forwarding/flow action table 7 outputs flow action information corresponding to a group of the flow Index 27 output from the flow retrieval table 5 and the forwading Index 29 output from the forwarding table 6 as well as the transmission VPI/VCI 31 acting as an output logical link number.

The specific retrieval to the forwarding/flow action table 7 will be explained later in detail.

The packet transmission and processing section 8 processes the packet 23 output from the packet receiving and processing section 2 based on the flow action information 30 output from the forwarding/flow action table 7 and then creates the transmission IP packet 32.

For example, the packet transmission and processing section 8 performs the TTL subtraction process or TOS filed rewriting process based on the flow action information 30. The queue control for delay priority or disposal priority is executed to queue for priority control inside of the packet transmission and processing section 8.

The cell transmission section 9 disassembles the transmission IP packet 32 output from the packet transmission and processing section 8 and creates the ATM cell 33 as transmission data. Thus, the cell transmission section 9 transmits an address indicating the connection transmission VPI/VCI 31 as an output logical link number output from the forwarding/flow action table 7.

Next, an example of the operation of the flow identification device in this embodiment will be explained below.

First, the process of the cell receiving section 1 and the operation of the packet receiving and processing section 2 will be explained below by referring to FIG. 5.

The cell receiving section 1 extracts the received VPI/VCI 21 from the header of a sequence of received ATM cells 20. As shown in FIG. 6, it is assumed that the transmission VPI/VCI 21 which has the value "1" acting as VPI and the value "32" acting as VCI is extracted. The extracted received VPI/VCI 21 is output to the retrieval flag table 3.

The cell receiving section 1 assembles the received IP packet 22 in accordance with AAL5 from the ATM cell 20. The received IP packet 22 is output to the packet receiving and processing section 2.

The packet receiving and processing section 2 extracts the each fields—IP header and TCP header—of the received IP packet 22, as the flow retrieval key 25. The extracted flow retrieval key 25 is output to the search key mask section 26.

Next, the retrieval process of the retrieval flag table 3 will be explained below with reference to FIG. 6.

The retrieval flag table 3 outputs a retrieval flag corresponding to the received VPI/VCI 21. The retrieval flag 24, for example, as shown in FIG. 7, is output as the retrieval flag 24 corresponding to a combination of the value "1" acting as VPI and the value "32" acting as VCI.

Figure 7:
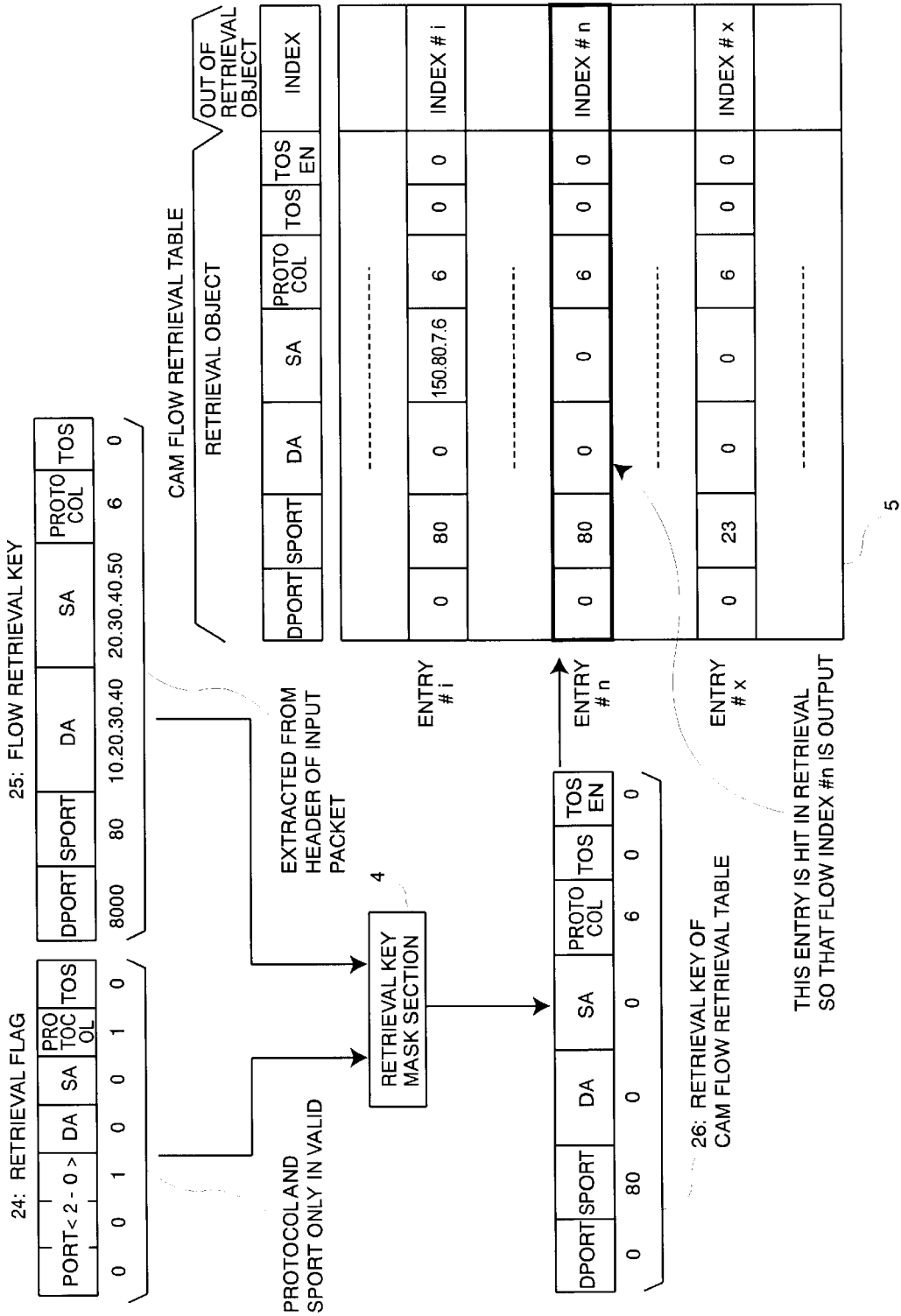
FIG. 7 is a diagram explaining creation of a post mask retrieval key and flow identification.

That is, the retrieval flag including "001" as "PORT<2-0>", "0" as "DA", "0" as "SA", "1" as "PROTOCOL", and "0" as "TOS" is retrieved as shown in FIG. 7.

The retrieval flag shows that only the fields "SPORT" and "PROTOCOL" of fields in the header are valid.

On the other hand, the packet receiving and processing section 2 receives the received IP packet 22 from the cell receiving section 1 and then extracts as the flow retrieval key 25 each field of the header of the received IP packet 22.

As shown in FIG. 7, the flow retrieval key 25 including "8000" as "DPORT", "80" as "SPORT", "10. 20. 30. 40" as "DA", "20. 30. 40. 50" as "SA", "6" as "PROTOCOL", and "0" as "TOS" is extracted as shown in FIG. 7.

Next, the processes of the retrieval key mask section 4 and the CAM flow retrieval table 5 will be explained below by referring to FIG. 7.

First, the retrieval key mask section 4 masks the flow retrieval key 24 showed in FIG. 7 with the retrieval flag 25 and creates the post-mask retrieval key 26.

As shown in FIG. 7, the retrieval key including "0" as "DPORT", "80" as "SPORT", "0" as "DA", "0" as "SA", "6" as "PROTOCOL", "0" as "TOS", and "0" as "TOSEN" indicating valid or invalid of "TOS" is extracted as the post-mask retrieval key 26. In other words, in the post-mask retrieval key 26, only the value "80" as "SPORT" and the value "6" as "PROTOCOL" are valid while the values in the remaining fields are invalid.

In succession, the flow Index 27 corresponding to the post-mask retrieval key 26 is retrieved with reference to the CAM flow retrieval table 5.

As shown in FIG. 7, the entry number #n (No. n) is hit to the post-mask retrieval key 26 to be retrieved. The value "2" of the flow Index #n registered in the entry #n is output as shown in FIG. 8.

Next, the retrieval processes of the forwarding table 6 and the forwarding/flow action table 7 will be explained with reference to FIG. 8.

First, the packet receiving and processing section 2 retrieves the forwarding Index 29 on the forwarding table 7, with the destination address (DA) 28 as the retrieval key extracted from the received IP packet 22.

Figure 8:
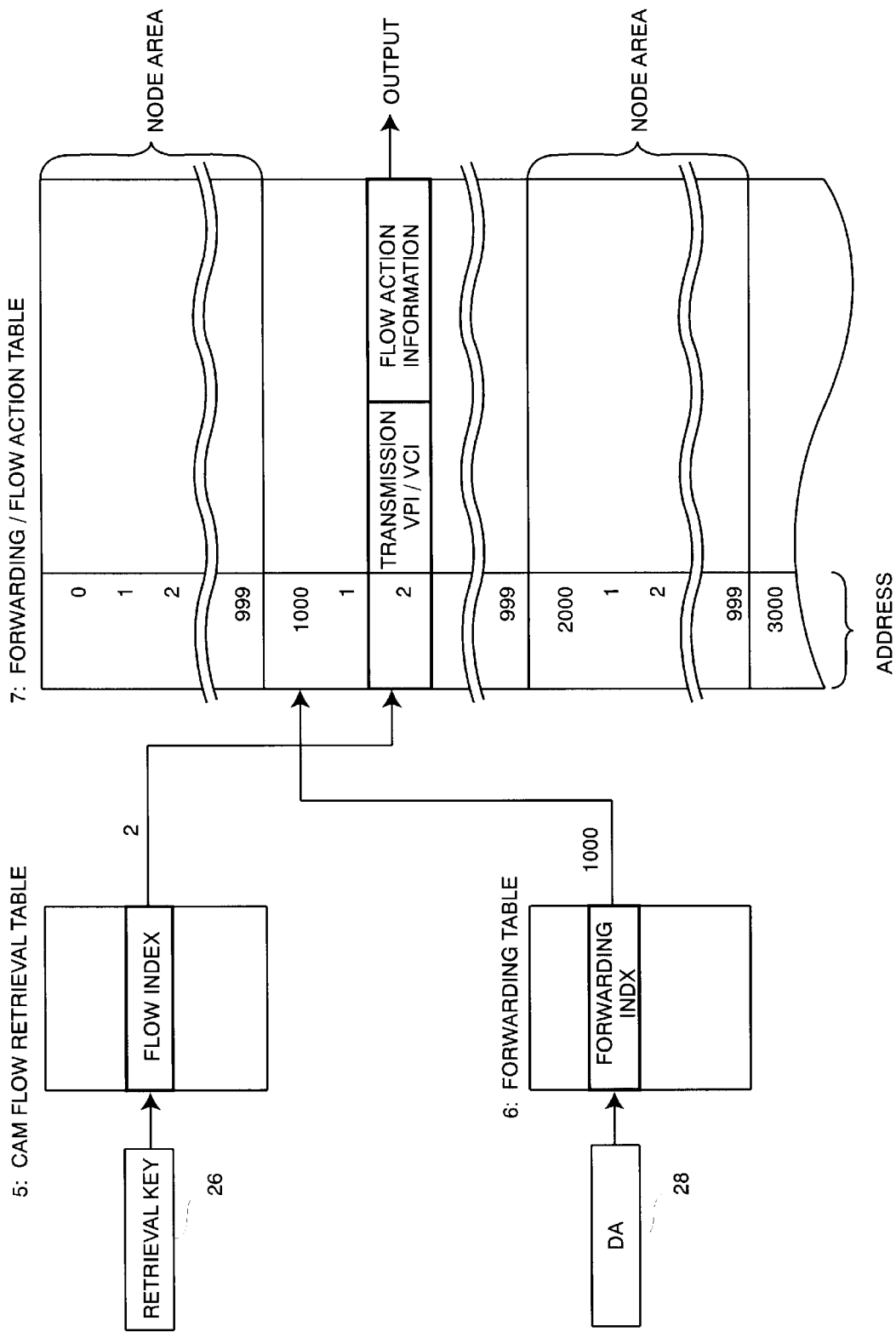
FIG. 8 is a diagram illustrating a retrieval process in a forwarding/flow action table.

The value "1000" of the forwarding Index 29 shown in FIG. 8 are output to the values "10. 20. 30. 40" of DA 28 shown in the flow retrieval key 25 shown in FIG. 7.

In succession, the flow action information 30 and the transmission VPI/VCI 31 corresponding to a combination of the flow Index 27 and the forwarding Index 29 are retrieved with reference to the forwarding/flow action table 7.

The forwarding Index corresponds to a node area of the forwarding/flow action table 7 one to one. The value of the forwarding Index indicates the leading address of one node area. For example, the value "1000" of the forwarding Index 29 corresponds to the leading address "1000" of one node area.

Moreover, the value of the flow Index corresponds to the address of any one of entries in the node area. That is, the value indicates the distance from the leading entry of the node area. Hence, the value "2" of the flow Index 27 corresponds to the address of the node area "1002".

A combination of the flow Index and the forwarding Index is made as a retrieval key. Thus, of plural flow actions corresponding to one forwarding Index determined by one destination address (DA), one flow action can be selected with the flow Index.

The transmission VPI/VCI of an entry to the address "1002", corresponding to the flow Index 7 and the forwarding Index 29 is output to the cell transmission section 9 while the flow action information 30 is output to the packet transmission and processing section 8.

The packet transmission and processing section 8 changes the TOS field value according to the flow action information 30 containing the information for setting QoS and performs the TTL subtraction process, thus creating the transmission IP packet 32. The created transmission IP packet 32 is output to the cell transmission section 9.

Moreover, the packet transmission and processing section 8 switches the internal route therein in accordance with the flow action information 30 and implements queue control such as packet delay priority or rejection priority.

The cell transmission section 9 divides the transmission IP packet 32 according to AAL, in reverse order to the process procedure in the packet receiving process 2 shown in FIG. 5, and creates a sequence of transmission ATM cells 33. The transmission ATM cell 33 is output to the address indicating the transmission VPI/VCI 31. Thus, the flow process is ended.

Second Embodiment

The example of configuring the retrieval flag with flags in field units has been explained in the first embodiment. However, in the second embodiment, the retrieval flag is configured of a bitmap.

Figure 9:
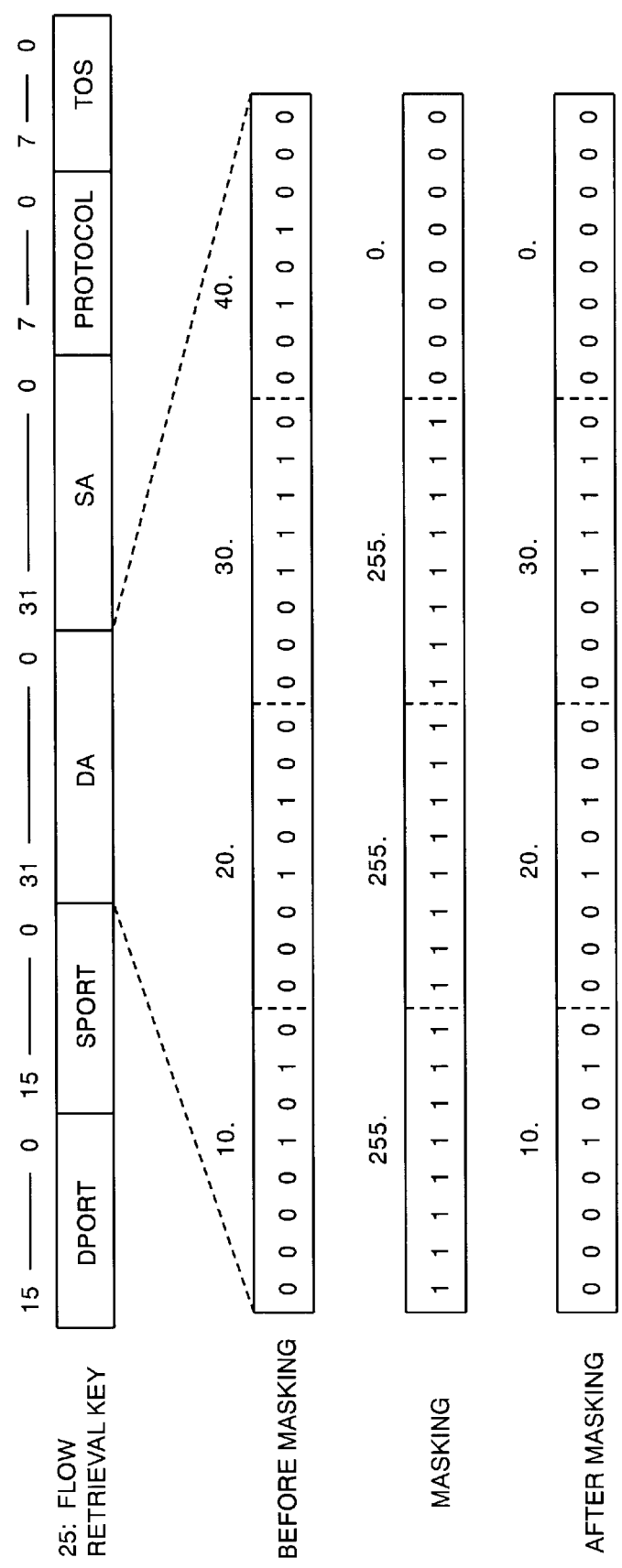
FIG. 9 is a diagram illustrating a mask in a bitmap according to a second embodiment of the present invention.

FIG. 9 depicts an example of masking a flow retrieval key with a retrieval flag of a bitmap. Referring to FIG. 9, the flow retrieval key is formed of fields—16 bits as "DPORT", 16 bits as "SPORT", 32 bits as "destination address (DA)", 32 bits as source address (SA)", 8 bits as "PROTOCOL", and 8 bits "TOS".

Here, the 32-bit field as "destination address (DA)" of each field of the flow retrieval key will be explained with emphasis.

The DA field includes values "10. 20. 30. 40", as shown in FIG. 9.

The bitmap of the mask of the retrieval flag to the DA field includes values "255, 255, 255, 0", as shown in FIG. 9. That is, of 32 bits of the DA field in the bitmap of the mask, the upper 24 bits are valid bits and the lower 8 bits are invalid bits.

A post-mask retrieval key, as shown in FIG. 9, is selected by processing the DA field of the flow retrieval key with the mask. The bitmap configuring the post-mask retrieval key is aquired by respectively multiplying bits configuring the DA field of the flow retrieval key by a corresponding bit value (1 or 0). That is, the bitmap of the post-mask retrieval key is "10. 20. 30. 0".

Hence, the network address formed of partial bits of DA can be handled as a post-mask retrieval key. As a result, the post-mask retrieval key is applicable to all users having the network address called "10. 20. 30. xx (where xx represents an arbitrary integer more than 0 and less than 255) of which the upper 24 bits are common.

Similarly, even each of fields, for example, SA, other than the DA field, can be masked with a bitmap. A part of fields may be masked with a bitmap. Other fields may be masked in field units, in a manner similar to that in the first embodiment.

The procedure after the post-mask retrieval key creation is similar to that of the first embodiment, hence the duplicate explanation will be omitted here.

Third Embodiment

Next, the third embodiment of the present invention will be explained here.

In the first embodiment, the example where an input port receives received data and an output port outputs transmission data has been explained. In the third embodiment, the example where plural ports are accommodated together will be explained below.

Figure 10:
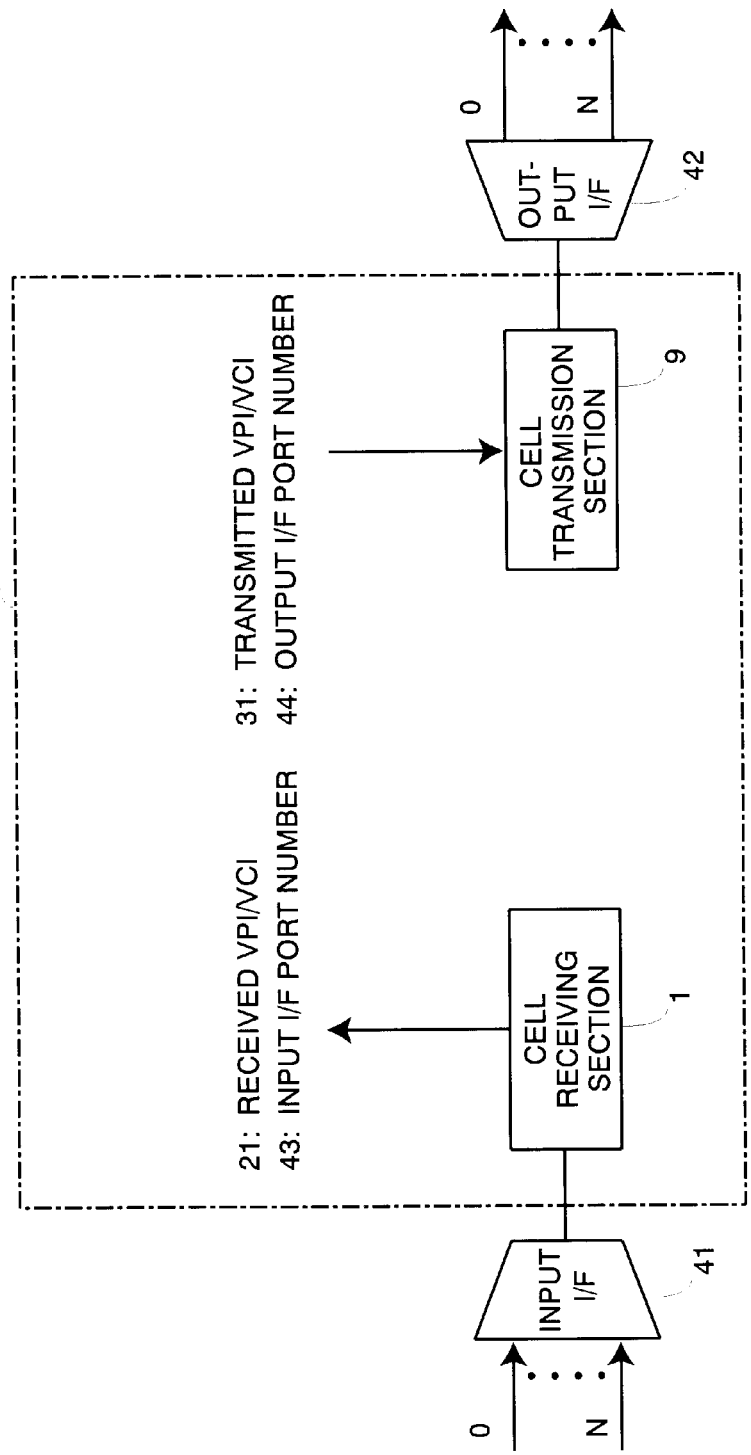
FIG. 10 is a block diagram explaining the configuration of a flow identification device according to a third embodiment.

Here, FIG. 10 illustrates the configuration of the flow processing device according to the third embodiment. The configuration of the flow processing device 100 shown in FIG. 10 is similar to that in the first embodiment shown in FIG. 1. Hence, the constituent elements are partially omitted in FIG. 10.

As shown in FIG. 10, in the third embodiment, the received ATM cell which is input any one of (n+1) input interface ports (input I/F ports) of the input interface (input I/F) 41 is input to the cell receiving section 1.

The cell receiving section 1 outputs the input I/F port number 43 to the retrieval flag table (not shown in FIG. 10), together with the received VPI/VCI 21 extracted from the header of the ATM cell. The input I/F port number 43 acts as an input physical port number indicating whether from which input I/F port the ATM cell has been received. The retrieval flag table utilizes the input I/F port number 43 as a retrieval key, in addition to the received VPI/VCI 21, and outputs a corresponding retrieval flag, in a manner similar to that in the first embodiment.

In a manner similar to that in the first embodiment, the transmission VPI/VCI 31 is input to the cell transmission section 9. In the third embodiment, the forwarding/flow action table (not shown in FIG. 10) registers the output I/F port number 44 as an output physical port number in addition to the transmission VPI/VCI 31. For that reason, the cell transmission section 9 receives the output I/F port number 44, together with the transmission VPI/VCI 31.

The transmission ATM cell output from the cell transmission section 9 is input to the output interface (output I/F) 42 and is output from any one of (n+1) output interface ports (output I/F ports) in accordance with the output I/F port number 44.

As described above, the present invention is easily applicable to the case where plural ports are accommodated together.

Fourth Embodiment

Next, the fourth embodiment of the present invention will be explained below with reference to FIG. 11.

Regarding the above-mentioned embodiments, the example where the ATM cell is received as received data has been explained. However, in the fourth embodiment, the example where a frame relay is received as received data will be explained below.

Figure 11:
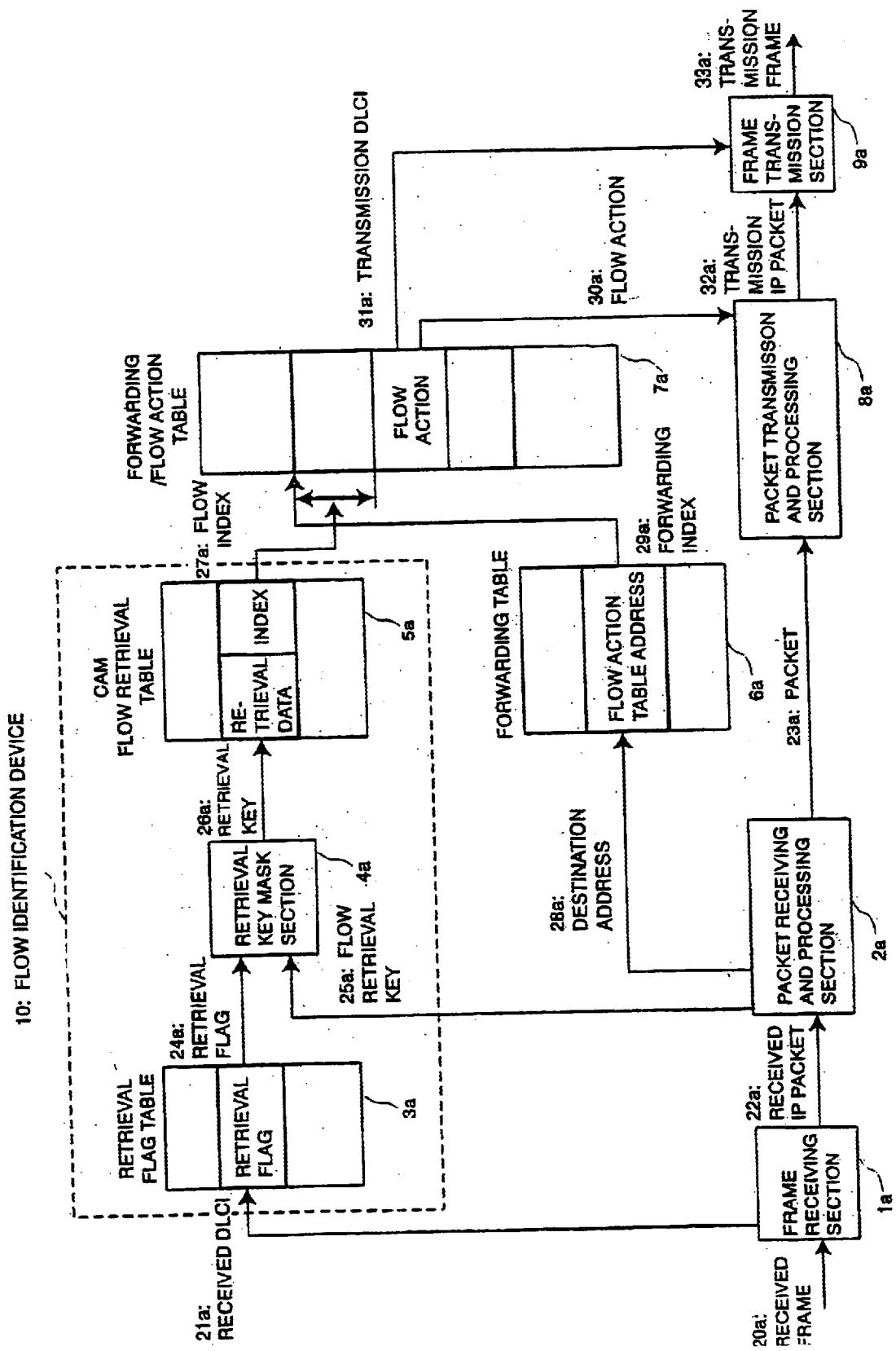

As shown with the block diagram in FIG. 11, the flow processing device of the fourth embodiment has fundamentally the same configuration as that in the first embodiment, except the frame receiving section 1a and the frame transmission section 9a.

When receiving the received frame 2a, the frame receiving section 1a extracts DLCI 21a of the received frame 20a and then outputs it to the retrieval flag table 3a. Furthermore, the frame receiving section 1a, as shown in FIG. 12, terminates the received frame 20a and creates the received IP packet 22a.

In the retrieval flag table 3a, the DLCI 21a acting as an input logical link number is utilized as a retrieval key and a corresponding retrieval flag is output in a manner similar to that in the first embodiment.

The subsequent steps are similar to those in the first embodiment.

In the fourth embodiment, the transmission DLCI 31a is registered as an output logical link number to the forwarding/flow action table 7a. The frame transmission section 9a outputs the transmission DLCI 31a. The frame transmission section 9a creates the transmission frame 33a from the transmission IP packet 32a in reverse order to the procedure shown in FIG. 12.

As described above, the present invention is preferably utilized to the flow identification of a frame relay.

In the above embodiments, the examples where the present invention is configured under specific conditions have been explained. However, the present invention can be subjected to various modifications.

For example, in the first, second and third embodiments, the example where VPI and VCI are used as an input logical link number and as an output logical link number has been explained. However, the present invention is not limited to those embodiments only. For example, the present invention may be applicable to the case where a frame relay is received as received data.

Moreover, VPI only may be used as an input logical link number in, for example, the VP connection service, which manages VPI only in a network and in which users can arbitrarily use VCI.

In the above-mentioned embodiments, "0" is used as a value indicating invalid of a field. However, in the present invention, the invalid indicating value is not limited to "0" but an arbitrary suitable value can be used. For example, the value, not defined by RFC1700, to which an invalid value setting register is disposed may be used as an invalid indicating value.

As described above, according to the present invention, an IP flow identification requirement for each input link number, that is, a retrieval flag indicating a field to be flow retrieved among fields of an packet header is set on the retrieval flag table. The retrieval flag masks each field of a packet header extracted from a received IP packet so that a post-mask retrieval key is created. By using the post-mask retrieval key, the number of entries to the flow retrieval table can be decreased. As a result, a content-addressable memory, which can perform only the exact matching, can be used as a flow retrieval table for flow identification so that flow identification can be performed at high speed.

According to the present invention, the flow identification device can ensure QoS without bottlenecking the processing on the high-speed broadband network. Moreover, the flow identification device can be preferably used even in the high-throughput requiring area in the backbone network.

Moreover, using a content-addressable memory as a flow retrieval table allows the flow identification process to be performed at high speed and the flow retrieval table to be prevented from large-scaling.

Thus, since the flow retrieval table can be prevented form large scaling, the IP flow, which can be generally realized with software only, the flow identification process for QoS mapping compatible for the ATM logical link, can be realized with the level of hardware such as dedicated LSI chips. The flow identification in a hardware level can be executed at higher speed.

What is claimed is:

1. A flow identification device comprising:
   a retrieval flag table for storing an input logical link number of received data and a retrieval flag in a corresponding relationship, said retrieval flag setting a field to be retrieved among fields in a header of a received IP (internet protocol) packet terminating said received data, and for outputting a retrieval flag corresponding to an input logical link number extracted from said received data;
   a mask section for masking each field in a header of said received IP packet with said retrieval flag and creating a post-mask retrieval key; and
   a flow retrieval table configured of a content-addressable memory, for storing said post-mask retrieval key and a flow identification result in a corresponding relationship and outputting a flow identification result corresponding to a post-mask retrieval key output from said mask section.

2. The flow identification device defined in claim 1, wherein said flow retrieval table stores a corresponding numerical value in a field to be validated in retrieval as said retrieval flag and an invalid value in a field to be invalidated in retrieval.

3. The flow identification device defined in claim 1, wherein said retrieval flag indicates valid or invalid of respective bits forming said field.

4. The flow identification device defined in claim 1, wherein when said received data is an ATM (asynchronous transfer mode) cell, one or both of a virtual path identifier and a virtual channel identifier are used as said input logical link number and as said output logical link number.

5. The flow identification device defined in claim 1, wherein when said received data is a frame relay, DLCI (data link connection identifier) is used as said input logical link number and as said output logical link number.

6. The flow identification device defined in claim 1, wherein fields for TOS (type of services), PROTOCOL, source address, and destination address of an IP header as well as fields for a source port and a destination port of TCP (transmission control protocol) or UDP (user datagram protocol) header are included as the header field of said received IP packet.

7. A flow processing device comprising:
   a receiving section for extracting an input logical link number from received data and terminating said received data and creating a received IP packet;
   a packet receiving and processing section for extracting each field of a header as a retrieval key from said received IP packet and extracting a destination address and outputting a packet;
   a retrieval flag table for storing said input logical link number and a retrieval flag in a correspondence relationship, said retrieval flag setting a field to be retrieved among fields of the header of said received IP packet, and for outputting a retrieval flag corresponding to an input logical link number extracted by said receiving section;
   a mask section for masking each field of a header of a received IP packet with said retrieval flag and creating a post-mask retrieval key;
   a flow retrieval table for storing a post-mask key and a flow retrieval as a flow identification result in a correspondence relationship and outputting a flow retrieval corresponding to a post-mask retrieval key output from said mask section, said flow retrieval table being formed of a content-addressable memory;
   a forwarding table for storing a destination address of a header of said received IP packet and a forwarding retrieval in a correspondence relationship and outputting a forwarding retrieval corresponding to a destination address output from said packet receiving and processing section;
   a flow action table for storing a group of said flow retrieval and said forwarding retrieval and flow action information having information setting QoS (quality of services) and an output logical link number in a correspondence relationship and for outputting flow action information and an output logical link number, corresponding to a group of a flow retrieval output from said flow retrieval table and a forwarding retrieval output from said forwarding table;

a packet transmission and processing section for processing a packet output from said packet receiving and processing section based on flow action information output from said flow action table and for creating a transmission IP packet; and a transmission section for disassembling said transmission IP packet to create a transmission cell and transmitting said transmission cell to an address indicating an output logical link number output from said flow action table.

8. The flow processing device defined in claim 7, wherein when said receiving section receives received data from any one of plural input ports and said transmission section transmits transmission data to any one of plural output ports, said receiving section outputs an input physical port number to said retrieval flag table, in addition to said input logical link number, said input physical port number indicating an input port which has received said received data, among said input ports, and wherein said flow action table outputs an output physical port number to said transmission section, in addition to an output logical link number, said output physical port number indicating an output port outputting said transmission data among said output ports.

9. A flow identification method comprising the steps of:

retrieving a retrieval flag corresponding to an input logical link number extracted from received data from a retrieval flag table, said retrieval flag table storing an input logical link number of received data and a retrieval flag setting a field to be retrieved among fields of a header of a received IP packet terminating said received data;

creating a post-mask retrieval key in a mask section by masking each field of a header of said IP packet with said retrieval flag; and storing a post-mask retrieval key and a flow identification result in a correspondence relationship and outputting a flow identification result corresponding to a post-mask retrieval key output from said mask section from a flow retrieval table, said flow retrieval table being configured of a content-addressable memory.

10. A flow processing method comprising the steps of:

extracting an input logical link number from received data and terminating said received data and creating a received IP packet;

extracting each field of a header as a retrieval key from said received IP packet while extracting a destination address;

retrieving a retrieval flag corresponding to an input logical link number extracted from received data from a retrieval flag table, said retrieval flag table storing said input logical link number and a retrieval flag setting afield to be retrieved among fields of a header of said received IP packet in a correspondence relationship;

creating a post-mask retrieval key in a mask section by masking each field of a header of a received IP packet with said retrieval flag;

storing a post-mask retrieval key and a flow retrieval as a flow identification result including information for setting QoS (quality of services) in a correspondence relationship and retrieving a flow retrieval corresponding to a post-mask retrieval key output from said mask section from a flow retrieval table, said retrieval table being configured of a content-addressable memory;

retrieving a forwarding index corresponding to a destination address extracted from a received IP packet from a forwarding table, said forwarding table storing a destination address of a header of said received IP packet and a forwarding index in a correspondence relationship;

retrieving flow action information and an output logical link number, corresponding to a group of a flow index retrieved with said flow retrieval table and corresponding to a forwarding index output with reference to a flow action table, said flow action table storing a group of said flow index and said forwarding index and flow action information including indication information setting QoS and an output logical link number, in a correspondence relationship;

processing said received IP packet based on flow action information output from said flow action table to create a transmission IP packet; and creating transmission data based on said transmission IP packet and transmitting said transmission data to a destination indicating an output logical link number output from said flow action table.

* * * * *